(12) United States Patent
Zhang et al.

(10) Patent No.: US 9,135,640 B2
(45) Date of Patent: Sep. 15, 2015

(54) DISTRIBUTING CONTENT

(75) Inventors: Fan Zhang, West New York, NJ (US); Sheng Ma, Ossining, NY (US)

(73) Assignee: Google Inc., Mountain View, CA (US)

( * ) Notice: Subject to any disclaimer, the term of this patent is extended or adjusted under 35 U.S.C. 154(b) by 714 days.

(21) Appl. No.: 12/464,574

(22) Filed: May 12, 2009

(65) Prior Publication Data

US 2010/0293218 A1    Nov. 18, 2010

(51) Int. Cl.
G06Q 30/02    (2012.01)
G06F 15/16    (2006.01)

(52) U.S. Cl.
CPC .......... *G06Q 30/0255* (2013.01); *G06Q 30/02* (2013.01); *G06Q 30/0241* (2013.01); *G06Q 30/0242* (2013.01); *G06Q 30/0251* (2013.01); *G06Q 30/0257* (2013.01); *G06Q 30/0264* (2013.01); *G06Q 30/0277* (2013.01)

(58) Field of Classification Search
CPC .......... G06Q 30/0251; G06Q 30/0241; G06Q 30/0242; G06Q 30/0277
See application file for complete search history.

(56) References Cited

U.S. PATENT DOCUMENTS

2005/0278443 A1* 12/2005 Winner et al. ................ 709/224
2007/0094042 A1*  4/2007 Ramer et al. ..................... 705/1
2007/0239534 A1   10/2007 Liu et al.
2008/0195462 A1    8/2008 Magdon-Ismail et al.
2009/0094093 A1    4/2009 Phan
2009/0204485 A1*   8/2009 Wills et al. ...................... 705/14
2010/0082413 A1*   4/2010 Huberman et al. ........... 705/14.4

FOREIGN PATENT DOCUMENTS

WO    WO 00-021293    4/2000    ............... H04N 7/08

OTHER PUBLICATIONS

International Search Report for International Patent Application No. PCT/US2010/034548 dated Dec. 22, 2010.
Authorized officer Athina Nickitas-Etienne, International Preliminary Report on Patentability in PCT/US2010/034548, mailed Nov. 24, 2011, 7 pages.
Office Action in Australian Application No. 2010249108, mailed Jul. 3, 2014, 3 pages.

* cited by examiner

*Primary Examiner* — Suraj Joshi
(74) *Attorney, Agent, or Firm* — Fish & Richardson P.C.

(57) ABSTRACT

A framework for content delivery includes a content distribution manager operable to select content for distribution in response to a request for content. The selection of content may be made based in part on scheduling information associated with sources of available content and selected by content providers. The selection may further be based in part on a content selection policy selected by publishers who initiate requests for content.

22 Claims, 3 Drawing Sheets

DISTRIBUTING CONTENT

TECHNICAL FIELD

This disclosure relates to media content distribution, including optimized content delivery in satisfaction of a reservation.

BACKGROUND

Media content may be distributed to provide many types of communication, such as news, entertainment, business, or other communication. Advertisements, for example, may be distributed to communicate information relating to goods and/or services of an associated advertising entity, or to communicate other information to an audience. One form of media content includes electronic advertisements, such as those distributed on the Internet. For electronic advertisements and other forms of media content, advertising entities or other suppliers of media content may desire to schedule delivery of selected media content according to selected criteria, such as geographical scope of distribution, timing of delivery of media content, delivery volume, or the like.

Particularly when media content is distributed on the Internet, numerous options exist with regard to scheduling criteria as a result of the large number of publishing options. For example, a website owner or operator may want to include a space for advertisement or other media content distribution on one or more pages of the website. Each time an instantiation of a page is generated, there is an opportunity to deliver media content for display in the space. Given the number of web pages accessible through the Internet, and given the frequent use of the Internet by numerous individuals, Internet websites offer a varied and abundant source of publishing space for media content distribution; perhaps the most varied and abundant among all sources.

SUMMARY

In one general aspect, delivering content in response to a request for content includes receiving a request for content, assigning a value to the request for content based on at least one characteristic of the request, obtaining a respective value threshold for multiple sources of content, selecting a source of content based on a comparison of the assigned value to each value threshold, and transmitting an indication of the selected source of content in order to deliver content associated with the selected source of content to the source of the request for content.

Implementations may include one or more of the following features. For example, the characteristic can be a schedule satisfaction index value, and can be determined based on a schedule selected by a content provider associated with the source of content. Additionally, obtaining a value threshold can include identifying a value threshold for a source of content based on a function of a value threshold that is variable with a characteristic of the source of content.

Selecting the source of content can include determining, based on scheduling information associated with a source of content, that the source of content may be selected. The scheduling information can be provided by a content provider associated with the source of content. Additionally, selecting the source of content can also include determining, based on respective scheduling information associated with multiple sources of content, that multiple sources of content may be selectable, and selecting one of the selectable sources of content. Furthermore, selecting one of the selectable sources of content can include selecting one of the selectable sources of content according to a selection policy.

In another general aspect, selecting an advertisement source in response to a request for an advertisement includes determining whether an advertisement source may be selected based on scheduling information of an ad campaign associated with the advertisement source, and determining, when the advertisement source may be selected, that the advertisement source should be selected based on the scheduling information and a value associated with the request for the advertisement. Whether the advertisement source must be selected based on the scheduling information is determined, and whether the advertisement source may be selected is determined when it is not determined that the advertisement source must be selected.

Determining whether the advertisement source may be selected can be based on a comparison of an indication of scheduling satisfaction to a threshold scheduling satisfaction, and determining whether the advertisement source should be selected can be based on a comparison of a value assigned to the request for an advertisement with a threshold value. Additionally the threshold value can be determined based on schedule satisfaction.

In another general aspect, selecting a content source includes receiving a content request, determining a value of the content request, selecting content sources from among available content sources based on a comparison of the value of the content request and a value threshold of each of the available content sources, and selecting a content source from the selected content sources based on a selection preference. The value threshold can be selected by a respective content provider, and the selection preference can be selected by a publisher. Optionally, available content sources can be identified from among all content sources based on scheduling information.

In another general aspect, selecting a content source includes determining whether to select a content source from a first group of content sources, and determining, when it is determined not to select a content source from the first group, whether to select a content source from a second group of content sources. Determining whether to select a content source from the first group can include determining whether an ad content source of the first group must be selected, determining, when no ad content source of the first group must be selected, whether an ad content source of the first group may be selected, determining to select a content source from the first group when a content source of the first group must be selected or when a content source of the first group may be selected, and determining not to select a content source from the first group when no content source of the first group must be selected or may be selected. Optionally, a content request is received, a value of the content request is determined, and determining to select a content source from the first group includes selecting a content source from among multiple content sources that may be selected based on a comparison of the value of the content request and a threshold value of each of the multiple content sources.

The details of one or more embodiments of the invention are set forth in the accompanying drawings and the description below. Other features will be apparent from the description and drawings, and from the claims.

DESCRIPTION OF DRAWINGS

Like reference symbols in the various drawings indicate like elements.

DETAILED DESCRIPTION

In response to a content request, a system may optimize a selection of a content source from among content sources provided by one or more content providers according to a selection policy of a publisher issuing the content request. The system may be operable to accommodate one or more scheduling criteria associated with each content source. The system may, for example, optimize a selection of advertising content to increase revenue generation for a publisher while satisfying a delivery schedule selected by an advertiser to increase, for example, click through rate, conversion rate, or audience saturation.

Figure 1:
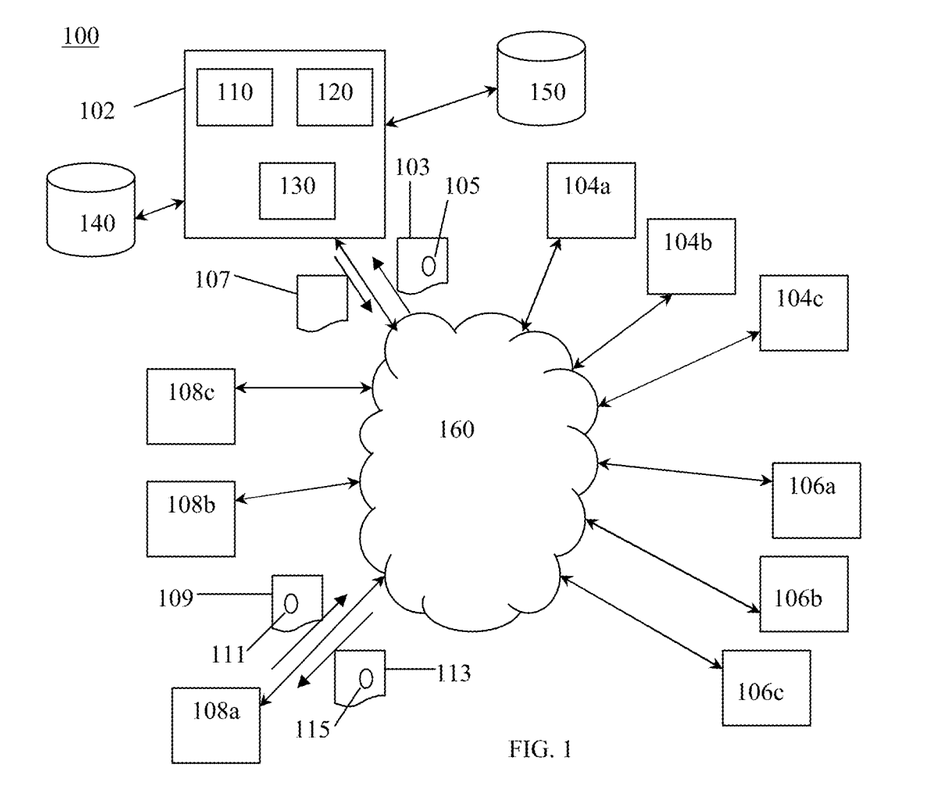
FIG. 1 is an illustration of an example system for distributing content.
Figure 2:
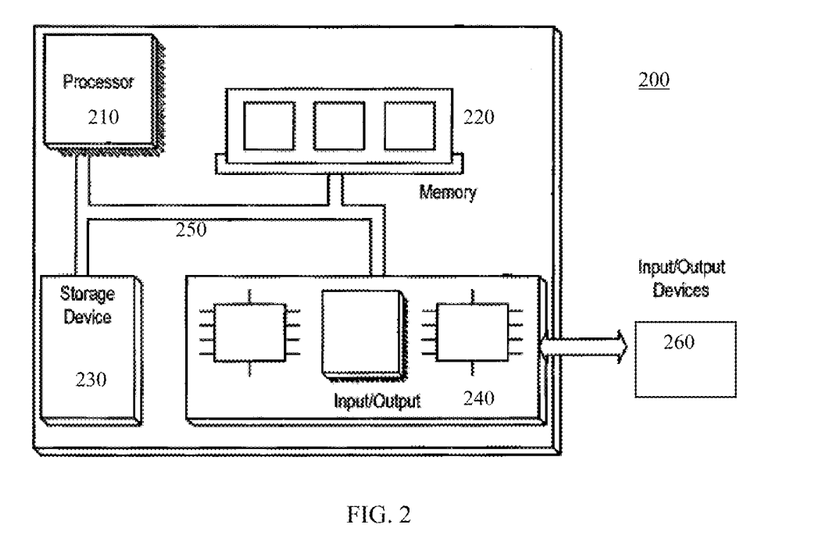
FIG. 2 is a diagram illustrating a computer system operable in the system of FIG. 1.

As shown in FIG. 1, a system 100 for distributing content includes, for example, a content distribution manager 102, content providers 104a-104c, publishers 106a-106c, and users 108a-108c, that interact with a network 160, such as the Internet. The content distribution manager 102, the content providers 104a-104c, and the publishers 106a-106c may be configured, for example, as one or more server computer(s), such as is illustrated by the generic computer 200 of FIG. 2. As shown, the computer 200 has one or more processors 210, memory modules 220, storage devices 230, and input/output devices 240. These components are connected by a system bus 250. The input/output devices 240 are operable with one or more peripheral devices, including a communication device for operable connection with the network 160 and with other components of system 100. Each of the users 108a-108c may communicate with one or more of the publishers 106a-106c via a respective communication device operable with the network 160 and including a communication link. Exemplary devices include personal computers, server computers, laptop computers, cellular phones, personal digital assistants (PDAs), televisions, radios, or other devices capable of outputting content to a user, including any associated software. Accordingly, each respective communication link may include one or more wired or wireless communication link, such as a radio, cellular, optical, satellite, cable, or other communication link.

In one particular web implementation, the communication devices and links associated with a respective one of the users 108a-108c are operable to transmit one or more page requests 109, to receive response 113 associated with a respective page request 109, and to provide an output to the user based on the response 113. The page request 109 may be generated and/or transmitted in response to a user input, or may be generated and transmitted automatically, such as at selected times or periodically at selected intervals. Each page request 109 may include selected information 111, such as information identifying a publisher that is the target destination of the request. Additionally, the request may include information 111 relating to the associated user and/or the associated device, such as information relating to the type of device used or the geographic location, age, gender, or other demographic information of the user. Each page request 109 may be received by a respective associated one of publishers 106a-106c, such as the publisher identified as the target destination of the request. Alternatively or additionally, however, a page request 109 may be received by the content distribution manager 102.

Regardless of the communication path, each of the publishers 106a-106c may, in response to a request 109 from a user, provide a response 113 to the user that originated the request 109, such as in the form of information relating to a web page. As an example, user 108a may navigate to a selected web page using a web browser on a laptop computer. The laptop computer may automatically transmit a request 109 to publisher 106a, which is a server hosting the selected web page. In response, publisher 106a transmits response 113 in the form of information sufficient to enable the laptop computer associated with user 108a to display the selected web page.

In many instances, the response 113 may include content 115, such as an advertisement. In instances where content 115 is included in the response, a determination is made that content 115 is to be included in a response 113 and a content request 103 is transmitted to and/or received in the content distribution manager 102. The content distribution manager 102 is operable to select a content source from a collection of content sources and to output a selection 107 indicating the content source selected. System 100 is operable to provide content 115 in or with the response 113, based on the selection 107 of a source of content. As illustrated in FIG. 1, the content request 103 and the selection 107 may be transmitted via the network 160. The content request 103 also may, alternatively, be generated by the content distribution manager 102 in response to a request 109, at least when system 100 is configured to route the request 109 directly to content distribution manager 102.

The content request 103 includes information 105, such as some or all of information 111 and/or information regarding a publisher associated with the request 109. For example, content request 103 may include information 105 regarding a time of origination of the content request 103, a time of origination of the request 109, a geographic location of user 108a, information regarding the device (hardware and/or software) with which user 108a created the request 109, an identity of publisher 106a, content selection preference information selected by publisher 106a, or preference information relating to user 108a. A value generator 110 is operable to generate a value associated with the content request 103, such as a value based on information 105 included with the request or based on other information specific to the content request 103. The generated value is assigned to the associated content request 103 for use in selecting the content 115 for inclusion in the response 113 from among available pieces of content associated with respective content sources. In the example discussed above, the content 115 may be advertising content for inclusion in or with the web page response 113 delivered to user 108a in response to the web page request 109.

In some implementations, the value generator 110 generates a value of the content request based at least in part on information about one or more content sources. That is to say, the value generator 110 can select a value of a content request 103 relative to a specific content source by generating a value of the content request 103 based on both the information 105 included in the request 103, and information about the content source. The information about the content source can include historic information regarding previous instances where the content source was selected for distribution, including information about a user's reaction to receiving content 115 associated with the content source. Thus, a selection of content 115 for distribution in response to the request 103 can be based on a value of the content request 103 relative to each content source, or each content source that is available for selection.

For example, the information 105 included in the request 103 may indicate demographic information about a user generating the request 103 that meets pre-selected demographic criteria for three advertisements, such as an advertisement for tickets to a sporting event, an advertisement for sports equipment, and an advertisement for a sports drink. The value generator 110 can generate a value of the request 103 relative to each of the three advertisements based on a revenue associated with each advertisement. The value of the request 103 relative to the advertisement for the tickets to a sporting event can be a function of the cost of a single ticket, the average number of tickets purchased by users, and the average rate at which users who receive the advertisement for the sporting event purchase tickets for the sporting event. The value of the request 103 relative to the advertisement for sports equipment can be a function of the average purchase total for users making a purchase of sports equipment after receiving the advertisement for sports equipment and the average rate at which users who receive the advertisement for sports equipment purchase sports equipment. The value of the request 103 relative to the advertisement for the sports drink can be a function of the average cost of multiple sizes of packages of the sports drink and the rate at which users purchase the sports drink after receiving the advertisement for the sports drink. The rate information can be derived from monitoring previous distribution of each of the advertisements and/or the rate information can be predicted by the advertiser.

Additionally, the information 105 included in the request 103 can be used to determine that the value of the request 103 is zero relative to one or more of the content sources. For example, where the information 105 included in the request 103 indicates that a user is located in a geographic location where an advertiser does not offer goods or services, then the request 103 may be of no value to the advertiser. Another example is where an advertiser for an automobile determines that requests from users who are less than a selected age are not valuable, such as users younger than the minimum age for receiving a driver's license. Furthermore, in the example discussed above, the value of the request 103 relative to the advertisement for a sports drink can also be a function of user-specific information, such as whether the user generating the request 103 frequently purchases the sport drink, or whether the user generating the request 103 has indicated that the user dislikes the sports drink promoted by the advertisement. Similarly, the value of the request 103 relative to the advertisement for the sports equipment can be a function of whether the ad request is associated with a web page where sports equipment can be purchased or a web page about sports generally, such as a page publishing current sports scores and news. Thus, the value generator can use various inputs in generating the value of each request relative to each source of content, and can use different inputs in generating the value based on a selection of a content provider associated with the content source.

The system 100 also may include a content data repository 140 and a content distribution history repository 150 operable with content the distribution manager 102. The content data repository 140 may be operable to store information regarding available sources of content for use in selecting a source of content in response to a request for content 103. Such information may include, for example, a copy of the content associated with one or more of the sources, information about a location of the content, information about the content, information about a respective associated one of content providers 104a-104c, and/or distribution criteria associated with each source of content, such as scheduling information. The content distribution history repository 150 may be operable to store information regarding past content source selections 107 made in response to content requests 103 for use in selecting a source of content in response to a content request 103. For example, content distribution history repository 150 may include information about the number of times a source of content has been associated with a selection 107, the time and date at which each selection 107 was made, the publisher for which each selection 107 was made, information regarding results of each selection 107, or other information regarding selections 107.

Figure 3:
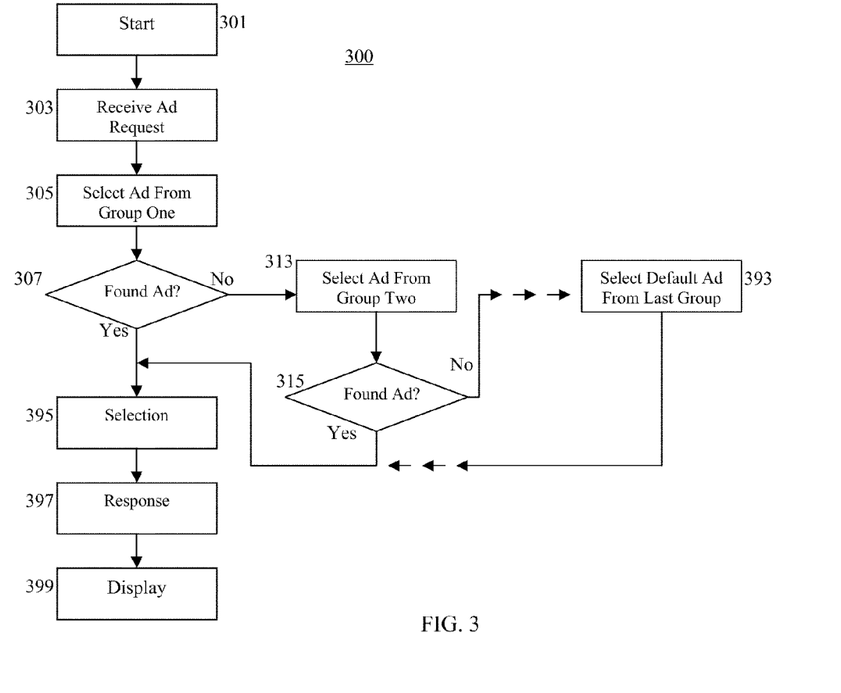
FIG. 3 is a flow chart illustrating an example procedure for distribution of content.

In use, the system 100 may enable delivery of the response 113 including the selected content 115 in response to the request 109 generated by a user according to the procedure 300 illustrated in FIG. 3. As an illustrative example, the request 109 may be a request for a web page, the response 113 may be information associated with the requested web page such that the requested web page may be displayed to the user, and the selected content 115 may be an advertisement selected according to the procedure 300. More specifically, the procedure 300 may begin when the web page request 109 is generated by a user/device (301). As discussed above, the web page request 109 may include information 111 regarding the user, the device, and/or the web page request 109 itself The web page request 109 may be received by the publisher of the web page identified in the request and the ad content request 103 may be generated by the publisher based on information about the web page (303). The ad content request 103 is received (303) in the content distribution manager 102 and an ad content selection is performed to select an ad content source from among ad content sources in a first group of ad content sources (305). A determination is made as to whether an ad content source was selected from the first group of ad content sources (307). If an ad content source was selected, then the ad content selection 107 is generated (395) and transmitted to the publisher. Information associated with the requested web page and the selected ad content is generated and transmitted to the user as the response 113 by the publisher(397). The procedure 300 then ends (399) with the web page and the selected ad content 115 being displayed to the user.

If, however, the determination is made that an ad content source was not selected from the first group of ad content sources (307), then an ad selection is performed to select an ad content source from a second plurality of ad content sources (313). Then a determination is made as to whether an ad content source was selected from the second group of ad content sources (315). If an ad content source was selected (313), then the ad content selection 107 is generated (395), information associated with the web page request 109 is generated and transmitted to the user as the response 113 (397), and the procedure 300 ends (399) with the web page and selected ad content 115 displayed to the user. If, the determination is made that an ad content source was not selected from the second plurality of ad content sources (315), the procedure 300 continues to sequentially perform an ad selection from a next group until an ad content source is selected and the procedure concludes (395, 397, and 399). Alternatively, if the selection is performed for all available groups of ad content sources without selecting an ad content source, the procedure performs an alternate ad content source selection that that is always select an ad content source (393). Thereafter, the procedure concludes (395, 397, and 399).

Some web pages may include multiple spaces for ad content. When such a page is requested, multiple ad content requests 103 may be generated (303) to select an ad content source for each space. In such a case, a corresponding selection or may be initiated for each of the generated ad content requests 103, and the content distribution manager 102 may require that the ad content source identified in each selection 107 for the multiple ad content requests 103 be different from and/or unrelated to each of the ad content sources such that duplicate advertisements may not be presented to the user on the web page display. Additionally, the groups of ad content sources may be selected such that that a desired selection result is achieved. For example, the ad content sources whose selection produces a preferred result may be included in the first group, so that they are more frequently considered for selection and subsequent distribution. Alternatively or additionally, if a reduction of processing time to obtain a selection of an ad content source is desired, ad content sources which are more likely to be selected may be included in the first group. Other sorting criteria may be used to selectively control the outcome or other characteristic of the selection function of the procedure 300.

In addition to the effects of such selective group formation, the specific methodology employed in the performance of one or more of selection steps 305, 313, and 393 may influence the selection function. For example, the selection of an ad content source from the first group 305 may include the exemplary procedure 400 illustrated in FIG. 4. Specifically, procedure 400 begins when an instruction to select and ad content source is received (401). For example, the instruction may be generated in response to the ad content request 103, as described above, and the instruction may be received by the selection engine 130 of the content distribution manager 102 when the procedure 400 is performed in the system 100.

Figure 4:
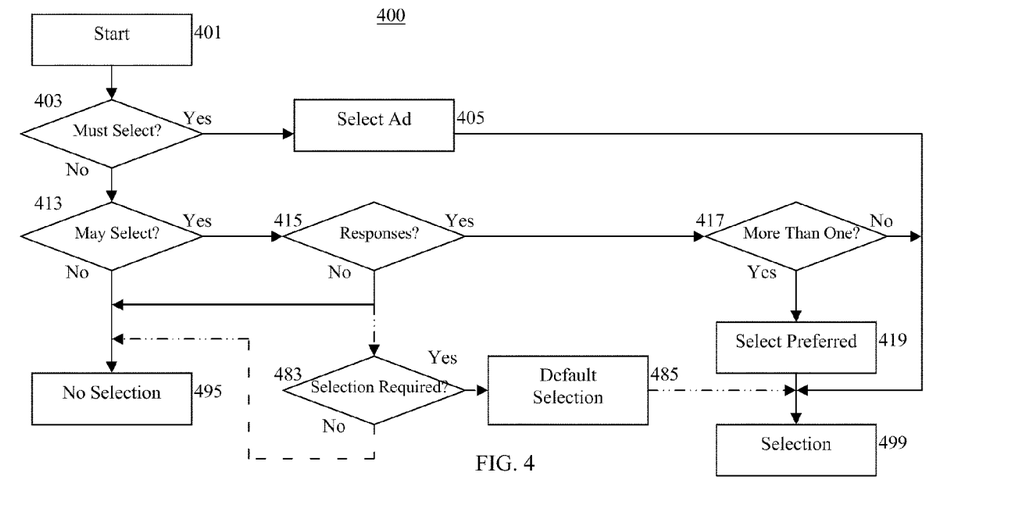
FIG. 4 is a flowchart illustrating an exemplary procedure for content selection.

Next, a determination is made as to whether any ad content sources must be selected (403). If it is determined that one or more ad content source must be selected (403), then ad content source that must be selected is selected (405) and the procedure 400 terminates by indicating the selected ad content source (499). For example, and with reference to FIG. 5, a determination may be made that an ad content source must be selected when a schedule satisfaction index value 501 associated with the ad content source is in the area 510, such that the index value is less than a predetermined lower threshold value 520 associated with the ad content source. The schedule satisfaction index value of each ad content source may be an indication of whether, and to what extent, the ad associated with the ad content source has been over-delivered or under-delivered. Such over-delivery or under-delivery may result from the ad content source being selected too frequently or too infrequently, compared to a desired delivery schedule selected, for example, by the content provider associated with the ad. In one example, the schedule satisfaction index value is a function of a number of times an ad content source has been selected compared to a total number of times the ad is to be delivered according to the delivery schedule, and is a function of an elapsed time from the beginning of the ad campaign compared to the total time duration of the ad campaign. The schedule satisfaction index value may be generated based on information stored in the content data repository 140 and the content distribution history repository 150, and may be updated after each selection 107, and/or periodically. Alternatively, the schedule satisfaction index value may be determined each time the instruction to select an ad content source is received.

Figure 5:
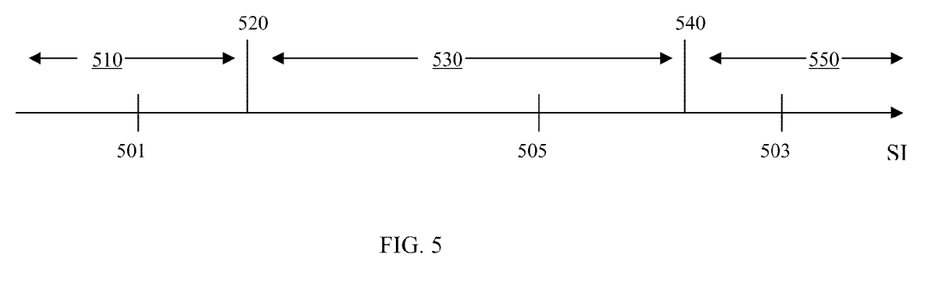
FIG. 5 is a chart illustrating a measure of content delivery.

With continued reference to FIGS. 4 and 5, if no ad content sources must be selected, then a determination is made as to whether any ad content sources may be selected (413). Such determination may be made, for example, based on a comparison of the schedule satisfaction index value of each ad content source to a respective upper threshold value 540 to determine whether each ad content source may be selected. Specifically, if a schedule satisfaction index value 503 associated with a given ad content source is within the area 550 that is greater than the upper threshold value 540, which indicates that the ad content source has been selected for delivery more than is desired based on the delivery schedule of the ad content, then selection of the ad content source may not be permitted, since such selection would cause the delivery of the ad to become further off schedule. Alternatively, other criteria may be used to determine whether an ad content source may be selected.

Figure 6:
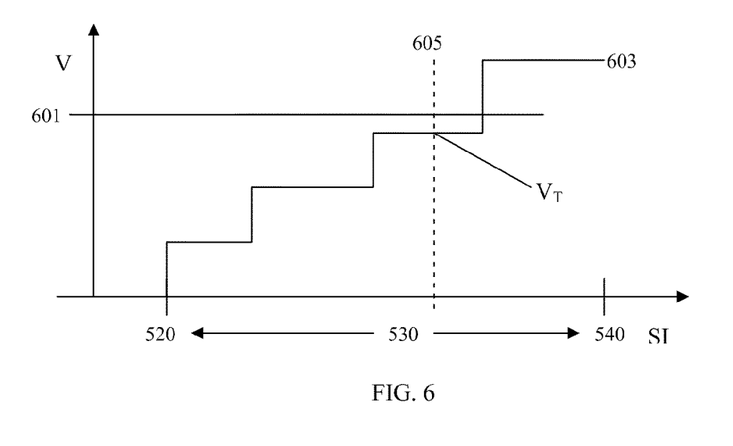
FIG. 6 is a graphical representation illustrating a relationship between a value threshold and a measure of content delivery.

If one or more ad content sources may be selected, such as when a schedule satisfaction index value 505 is within the area 530 between the lower threshold value 520 and the upper threshold value 540, then a determination is made as to whether any ad content sources should be selected (415), such as when at least one predetermined selection criteria is met. For example, and as illustrated in FIG. 6, a respective value 601 of the content request 103 relative to each content source that may be selected, such as the value generated by value generator 110 based on the content request 103 and any information 105 associated therewith, may be compared to a respective threshold value function 603 for each ad content source. A given ad content source should be selected only if the value 601 of the content request 103 is greater than or equal to a threshold value $V_T$ that is equal to a value of the threshold value function 603 based on the schedule satisfaction index value 605 (e.g., an intersection of the threshold value function 603 and the schedule satisfaction index value 605).

In a simple example, the lower threshold value 520 and/or the upper threshold value 540 can be provided for each content source by an associated content provider, and can be static. In other examples, the lower threshold value 520 and/or the upper threshold value 540 can be generated by a threshold generator 120. The thresholds may be based, for example, on information from the content distribution history repository 150 and/or information from the content data repository 140. For example, a content provider may specify an initial value for the lower threshold 520 and the upper threshold 540, which can be used, as described above, for determining whether the content source must, may, or may not be selected in response to a request. If the selected values for the lower threshold 520 and the upper threshold 540 are near to one another with a neutral or "on-schedule" satisfaction index value between them, then the content associated with the content source will be selected more regularly over time. Similarly, if the selected values are farther apart, the content source may be selected less regularly, allowing for periods of frequent selection and or periods of infrequent selection. The threshold generator 120 may be configured to adjust the initial values over time. For example, the content provider may be an advertiser, and may desire an ad to be selected frequently at the beginning of an advertising campaign. In this case, the content provider may select initial threshold values that differ by a relatively large amount and the threshold value generator 120 can generate the threshold values by using the values provided by the advertiser, such that the distribution manager 102 can select the ad frequently at the beginning of the campaign. As the ad is selected, the schedule satisfaction index value is adjusted to reflect the prior selections, and if selected a sufficient number of times in a period of time, the schedule satisfaction index value associated with the ad will reach the upper threshold. The advertiser may also desire to have the advertisement select at a more regular rate as the campaign progresses or nears completion. To achieve this result, the threshold value generator 120 can generate threshold values that are adjusted from the initial values provided by the advertiser such that the threshold values are nearer to one another as the campaign progresses.

Similarly, the threshold value function 603 can be static and can be provided for each content source by an associated content provider. In such an example, the threshold value function 603 is simply used to provide a threshold value $V_T$ based on a current schedule satisfaction index value associated with the content source. For example, the threshold value function 603 of each ad content source may be selected such that a threshold value $V_T$ selected based thereon is variable based on the schedule satisfaction index value 605 associated with the ad content source. As illustrated in FIG. 6, if the schedule satisfaction index value 605 of a given ad content source is near the lower threshold 520 for determining whether the ad content source must be selected (413), then the threshold value function 603 may provide a threshold value $V_T$ for use in determining whether the ad content source may be selected that may be less than a threshold value $V_T$ provided when the schedule satisfaction index value 605 indicates that the delivery history of the ad content source is on schedule. The threshold value $V_T$ provided by the threshold value function 603 may be even greater when the schedule satisfaction index value 605 is near the upper threshold value 540. Thus, the process 400 may reduce the chance of an ad content source being selected when the associated satisfaction index value indicates that the ad is at or near an over-delivery state, and may increase the chance of an ad content source being selected when the associated satisfaction index value indicates that the ad is at or near an under-delivery state. Accordingly, instances where an ad content source must be selected, and instances where an ad content source may not be selected, are reduced. Such reduction may increase content provider satisfaction, since their ads may be delivered more often when they are likely to provide more value.

Furthermore, the threshold generator 120, or another threshold generator dedicated to generating the threshold value function, may be used to generate the threshold value function 603 such that the threshold value function 603 can vary over time based on selected parameters. For example, a content provider may desire the content distribution manager to automatically adjust the threshold value function 603 in response to distribution feedback, such as a measured click-through rate or a measured conversion rate, or based on other criteria. Thus, the threshold generator can adjust the threshold value function 603 to adjust the selection characteristics for the content source when the schedule satisfaction index value 605 is between the lower threshold value 520 and the upper threshold value 540 (i.e., within the area 530).

In the example discussed above, if each of the advertisement for the tickets to the sporting event, the advertisement for the sports equipment, and the advertisement for the sports drink may be selected, then the value 601 of the request 103 relative to the advertisement for the tickets generated by the value generator 110 can be compared to a threshold value $V_T$ of the advertisement for the tickets indicated by an intersection of the value threshold function 603 of the advertisement for the tickets and the schedule satisfaction index value 605 for the advertisement for the tickets. An analogous comparison can be made for the advertisement for the sports equipment and the advertisement for the sports drink.

If it is determined that one or more ad content sources should be selected (415), then a determination is made as to whether more than one ad content source should be selected (417). If it is determined that only one ad content source should be selected (417), the procedure 400 terminates by indicating the selected ad content source (499), such as by generating an ad content source selection 107 for use in providing a response 113 including selected content 115 associated with the selected ad content source. If, instead, it is determined that more than one ad content source should be selected (417), then a particular ad content source is identified (419) and the particular ad content source is indicated as the selected ad content source (499). The particular ad content source may be selected according to a comparison of one or more characteristic of each of the ad content sources that should be selected. For example, the particular ad content source may be selected according to which ad content source will provide the most revenue if selected. Specifically, the ad content source with the greatest cost per instance, typically referred to as CPM (cost per thousand instances delivered), may be used to select the particular ad content source. Alternatively, an ad content source with the greatest value based on a function of click through rate and cost per click may be used to select the particular ad content source. Similarly, a function of conversion rate and cost per conversion may be used to determine which ad content source is selected. Additionally, an ad content source with the lowest schedule satisfaction index value may selected as the particular ad content source. Thus, the particular ad content source can be selected based on information about the request and information about the particular ad content source.

If, however, it is determined that no ad content source may be selected (413), or if it determined that no ad content sources that may be selected should be selected (415), then the procedure 400 may terminate by indicating that no ad content source has been selected (495). If the procedure terminates in this way when used with the procedure 300, for example, a determination may be made that no ad content source was selected from the first group (307) and an ad content source may be selected from the second group (313). As discussed above, there may be circumstances where an ad content source must always be selected. For example, when there is only one group of ad content sources, or when an ad content source must be selected from the last group, the procedure may optionally determine (483) whether the procedure is permitted to terminate without selecting an ad content source (495). If it is determined (483) that the procedure may not terminate without selecting an ad content source (495), an ad content source is selected (485) before the procedure ends (499). If, however, it is determined (483) that the procedure may terminate without making a selection (495), then the procedure terminates without selecting an ad content source (495).

As discussed above with reference to selecting a particular ad content source (419), the procedure 400 may select between competing ad content sources to identify a particular ad content source according to a conflict resolution procedure. For example, the procedure may select an ad content source that satisfies a selected requirement, or that exhibits a selected characteristic selected by the publisher that transmitted the content request 103. Thus, procedure 300 and/or procedure 400 may define a framework for ad content (or other content) source selection that may be configured to select an ad content source according to a selected ad content selection policy of a publisher that is publishing the ad content.

Within the framework, alternative ad content source selection policies may include different permutations of the steps described above, including steps 303, 313, 393, 403, 405, 413, 415, and 419, among others. In a simple example of the operation of the framework, a first ad content source selection policy may include a first conflict resolution policy. The first conflict resolution policy may always select an ad content source that that has a greatest measure of profitability, such as a greatest revenue per selection (i.e., per delivered impression), or a greatest likelihood that a viewer will "click through" the ad when delivered. An alternative conflict resolution policy may involve a random or pseudo-random selection from among ad content sources that should be selected, which may benefit publishers that prefer variety of ad content sources over increased revenue per ad delivery. Another conflict resolution policy may compromise between revenue and variety by weighting ad content sources with a greater value, but still allowing lower value ad content sources an opportunity to be selected for delivery. Yet another conflict resolution policy may always select the ad content source which is closest to its respective lower threshold value, or that is otherwise determined to be the most under-selected ad content source.

The framework balances the conflict resolution policies selected by the publishers 106a-106c to be used for ad content source selection for their respective content requests 103 with delivery schedules selected by the content providers 104a-104c. Specifically, the ad content providers may select the lower threshold value 520, the upper threshold value 540, and the threshold value $V_T$, or the threshold value function 605 that is used to determine the threshold value $V_T$ based on the schedule satisfaction index value 605. Thus, the framework allows for automatic consideration of ad content distribution criteria from both publishers and ad content providers. More specifically, in the illustrative examples described above, the content providers' selection of delivery schedule may dictate which ad content sources are available, and the publishers' conflict resolution policies may allow optimization of the selection from among the available ad content sources, at least in certain instances. Furthermore, the illustrative examples allow the content providers nuanced control over when their content may be selected for distribution in order to control the effectiveness of such distribution according to their selected schedule. In alternative examples, however, the selection of the conflict resolution policies, the threshold values 520, 540, and 603, and/or the delivery schedule, may be made by other entities, such as content distribution manager 102. For example, the content distribution manager 102 may select all variables in an attempt to achieve performance goals selected by an operator of the content distribution manager 102.

A number of implementations have been described. Nevertheless, it will be understood that various modifications may be made without departing from the spirit and scope of the claims. Accordingly, other implementations are within the scope of the following claims.

What is claimed is:

1. A computer-implemented method comprising:
receiving, from a user, a request for content;
identifying content sources eligible to satisfy the request;
determining index values for the content sources, each index value being an indication of an extent to which content provided by a content source has been delivered;
determining that a content source may be selected to deliver content by determining that an index value for the content source is between first and second thresholds, the first threshold distinguishing between content sources that must be selected based on prior delivered content and content sources that may be selected based on prior delivered content, and the second threshold distinguishing between content sources that may be selected based on prior delivered content and content sources that may not be selected based on prior delivered content;
assigning a relative value to the request for the content source based on at least one characteristic of the request, wherein the relative value is based on a historical rate of conversion of content from the content source and an average economic value to the content source realized by selection of content from the content source;
selecting the content source when the relative value of the request for the content source is greater than a point on a threshold value function, the point corresponding to an intersection of an index value for the selected content source and the threshold value function; and
transmitting an indication of a selected content source.

2. The computer-implemented method of claim 1, wherein the threshold value function is variable with characteristics of different content sources.

3. The computer-implemented method of claim 2, wherein the characteristics are derived from content distribution information stored in a content distribution history repository.

4. The computer-implemented method of claim 2, wherein the characteristics are determined based on schedule information selected by one or more content providers associated with the content sources and stored in a content data repository.

5. The computer-implemented method of claim 1, wherein the relative value is also based on a total economic value to the content source.

6. The computer-implemented method of claim 1, wherein the threshold value function is static and is specific to the content source.

7. The computer-implemented method of claim 1, wherein the threshold value function is adjustable based on content distribution feedback including click-through rate or a measured conversion rate.

8. The computer-implemented method of claim 1, wherein the content is online advertising and the first and second thresholds are specific to a campaign associated with the online advertising.

9. A computer-implemented method comprising: responsive to receiving a request for content, determining, by a content distribution manager, whether an advertisement source may be selected based on scheduling information of an ad campaign associated with the advertisement source and stored in a content data repository, the scheduling information comprising an index value that is an indication of an extent to which content provided by the advertisement source has been delivered, wherein determining whether the advertisement source may be selected comprises determining that the index value for the advertisement source is between first and second thresholds, the first threshold distinguishing between advertisement sources that must be selected based on prior delivered content and advertisement sources that may be selected based on prior delivered content, and the second threshold distinguishing between advertisement sources that may be selected based on prior delivered content and advertisement sources that may not be selected based on prior delivered content;
determining, by the content distribution manager and when the advertisement source may be selected, that the advertisement source should be selected based on the scheduling information and a relative value associated with the request for the content; and
selecting the advertisement source;
wherein determining comprises determining the relative value based on a historical rate of conversion of the content from the advertisement source for requests similar to the request and an average economic value to the advertisement source realized by selection of the advertisement; and wherein determining that the advertisement source should be selected comprises selecting the advertisement source when the relative value to the advertisement source is greater than a point on a threshold value function, the point corresponding to an intersection of the index value for the content source and the threshold value function.

10. The computer-implemented method of claim 9, wherein the first and second thresholds are specific to the ad campaign.

11. The computer-implemented method of claim 9, wherein the index value is an indication of whether, and to what extent, content associated with the advertising source has been over-delivered or under-delivered.

12. One or more non-transitory machine-readable media storing instructions executable by one or more processing devices to perform operations comprising:
receiving, from a user, a request for content;
identifying content sources eligible to satisfy the request;
determining index values for the content sources, each index value being an indication of an extent to which content provided by a content source has been delivered;
determining that a content source may be selected to deliver content by determining that an index value for the content source is between first and second thresholds, the first threshold distinguishing between content sources that must be selected based on prior delivered content and content sources that may be selected based on prior delivered content, and the second threshold distinguishing between content sources that may be selected based on prior delivered content and content sources that may not be selected based on prior delivered content;
assigning a relative value to the request for the content source based on at least one characteristic of the request, wherein the relative value is based on a historical rate of conversion of content from the content source and an average economic value to the content source realized by selection of content from the content source;
selecting the content source when the relative value of the request for the content source is greater than a point on a threshold value function, the point corresponding to an intersection of an index value for the selected content source and the threshold value function; and
transmitting an indication of a selected content source.

13. The one or more non-transitory machine-readable media of claim 12, wherein the threshold value function is variable with characteristics of different content sources.

14. The one or more non-transitory machine-readable media of claim 13, wherein the characteristics are derived from content distribution information stored in a content distribution history repository.

15. The one or more non-transitory machine-readable media of claim 13, wherein the characteristics are determined based on schedule information selected by one or more content providers associated with the content sources and stored in a content data repository.

16. The one or more non-transitory machine-readable media of claim 12, wherein the relative value is also based on a total economic value to the content source.

17. The one or more non-transitory machine-readable media of claim 12, wherein the threshold value function is static and is specific to the content source.

18. The one or more non-transitory machine-readable media of claim 12, wherein the threshold value function is adjustable based on content distribution feedback including click-through rate or a measured conversion rate.

19. The one or more non-transitory machine-readable media of claim 12, wherein the content is online advertising and the first and second thresholds are specific to a campaign associated with the online advertising.

20. One or more non-transitory machine-readable media storing instructions executable by one or more processing devices to perform operations comprising:
responsive to receiving a request for content, determining, by a content distribution manager, whether an advertisement source may be selected based on scheduling information of an ad campaign associated with the advertisement source and stored in a content data repository, the scheduling information comprising an index value that is an indication of an extent to which content provided by the advertisement source has been delivered, wherein determining whether the advertisement source may be selected comprises determining that the index value for the advertisement source is between first and second thresholds, the first threshold distinguishing between advertisement sources that must be selected based on prior delivered content and advertisement sources that may be selected based on prior delivered content, and the second threshold distinguishing between advertisement sources that may be selected based on prior delivered content and advertisement sources that may not be selected based on prior delivered content;
determining, by the content distribution manager and when the advertisement source may be selected, that the advertisement source should be selected based on the scheduling information and a relative value associated with the request for the content; and
selecting the advertisement source;
wherein determining comprises determining the relative value based on a historical rate of conversion of the content from the advertisement source for requests similar to the request and an average economic value to the advertisement source realized by selection of the advertisement; and
wherein determining that the advertisement source should be selected comprises selecting the advertisement source when the relative value to the advertisement source is greater than a point on a threshold value function, the point corresponding to an intersection of the index value for the content source and the threshold value function.

21. The one or more non-transitory machine-readable media of claim 20, wherein the first and second thresholds are specific to the ad campaign.

22. The one or more non-transitory machine-readable media of claim 20, wherein the index value is an indication of whether, and to what extent, content associated with the advertising source has been over-delivered or under-delivered.

* * * * *